US012704806B2

(12) United States Patent
Fukuhara

(10) Patent No.: US 12,704,806 B2
(45) Date of Patent: Aug. 11, 2026

(54) OPTICAL SCANNING DEVICE AND IMAGE FORMING APPARATUS

(71) Applicant: CANON KABUSHIKI KAISHA, Tokyo (JP)

(72) Inventor: Hiroyuki Fukuhara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 19/036,911

(22) Filed: Jan. 24, 2025

(65) Prior Publication Data

US 2025/0244708 A1 Jul. 31, 2025

(30) Foreign Application Priority Data

Jan. 26, 2024 (JP) ................................ 2024-009999

(51) Int. Cl.
*G03G 21/00* (2006.01)

(52) U.S. Cl.
CPC . *G03G 21/0052* (2013.01); *G03G 2221/0026* (2013.01)

(58) Field of Classification Search
CPC ................................................. G03G 21/0052
USPC ................................................. 399/177, 343
See application file for complete search history.

(56) References Cited

U.S. PATENT DOCUMENTS 11,809,093 B2 * 11/2023 Matsuo ............ G03G 15/04036
2004/0125266 A1 7/2004 Miyauchi et al. .............. 349/57
2006/0001980 A1 1/2006 Namba ......................... 359/649
2015/0338768 A1 11/2015 Nagatoshi et al. .. G03G 15/043
2016/0131896 A1 5/2016 Nakamura et al. .. G02B 26/121
2016/0363883 A1 12/2016 Fukuhara ............. G03G 15/043
2018/0113396 A1 4/2018 Fukuhara ......... G03G 15/04036
2019/0265608 A1 8/2019 Nishiguchi et al. ......................... G03G 15/04072
2024/0337965 A1 10/2024 Yamano et al. ... G03G 15/0435
2025/0138449 A1 5/2025 Obara et al. ....... G03G 15/0435

FOREIGN PATENT DOCUMENTS

CN 105612455 A * 5/2016 ........... G03G 15/043
JP 2006-044229 2/2006
JP 2009-187025 8/2009
JP 2009-244521 10/2009
JP 2016-033529 3/2016
JP 2018132639 A * 8/2018

* cited by examiner

*Primary Examiner* — Hoan H Tran
(74) *Attorney, Agent, or Firm* — Venable LLP

(57) ABSTRACT

An optical scanning device includes a light source, a deflecting unit, an optical member group, a casing and a light transmissive member. The casing accommodates in the deflecting unit and the optical member group and includes an opening through which a laser light emitted from the light source passes. The light transmissive member covers the opening. The light transmissive member includes a base surface and a plurality of projected portions provided on the base surface. When a distance between a center portion of one of the projected portions and a center portion of the projected portion adjacent to the one of the projected portions with respect to a longitudinal direction of the light transmissive member is defined as an interval between the projected portions, a height of the projected portions from the base surface is larger than the interval.

15 Claims, 11 Drawing Sheets

OPTICAL SCANNING DEVICE AND IMAGE FORMING APPARATUS

FIELD OF THE INVENTION AND RELATED ART

The present invention relates to an optical scanning device and an image forming apparatus, and relates to an optical scanning device used in, for example, copiers, printers, facsimile machines and the like, that scans a surface to be scanned with a laser light, and an image forming apparatus equipped with this optical scanning device.

A casing of the optical scanning device is provided with openings (emitting ports) through which the laser light passes to irradiate a photosensitive drum (surface to be scanned). In order to prevent dust, toner and the like from entering the optical scanning device through this opening, it is known to provide a dustproof member (transparent member) that covers the openings on the casing of the optical scanning device. Further, a configuration has been proposed in which a mechanism is provided for cleaning dust or toner adhering to the dustproof member, thereby preventing deterioration of image quality due to dust or toner (for example, Japanese Laid-Open Patent Application (JP-A) 2006-044229)

However, it is difficult to completely remove dust and toner adhering to the dustproof member. In order to remove such dust and toner, it is necessary to rub a cleaning member against the dustproof member, or to repeat a cleaning operation a plurality of times. In order to strongly press the cleaning member against the dustproof member, the rigidity of the cleaning member must be increased to provide strength, resulting in increased costs. Further, in order to repeat the cleaning operation a plurality of times, the dustproof member and cleaning member must be durable, which requires the use of parts having higher strength, resulting in increased costs.

SUMMARY OF THE INVENTION

The present invention has been made under such a situation, and an object of the present invention is to easily remove foreign matter such as dust and toner adhering to the dustproof member included in the optical scanning device.

In order to solve the above problems, the present invention has the following configuration. According to an aspect of the present invention, there is provided an optical scanning device comprising: a light source configured to emit a laser light; a deflecting unit configured to deflect the laser light; an optical member group configured to image the laser light, deflected and scanned by the deflecting unit, to a scanned member; a casing in which the deflecting unit and the optical member group are accommodated, the casing including an opening through which the laser light passes; and a light transmissive member configured to cover the opening, wherein the light transmissive member includes a base surface and a plurality of projected portions provided on the base surface, and wherein when a distance between a center portion of one of the projected portions and a center portion of the projected portion adjacent to the one of the projected portions with respect to a longitudinal direction of the light transmissive member is defined as an interval between the projected portions, a height of the projected portions from the base surface is larger than the interval. An image forming apparats for forming a toner image on a recording material, comprising: a photosensitive member as the scanned member; an optical scanning device according to claim 1, the optical scanning device scanning the laser light to the photosensitive member in response to image information and forming an electrostatic latent image on the photosensitive member; a developing device configured to develop the electrostatic latent image formed on the photosensitive member with toner and form a developer image; and a transfer unit configured to transfer the developer image onto the recording material.

Further features of the present invention will become apparent from the following description of exemplary embodiments with reference to the attached drawings.

Figure 2:
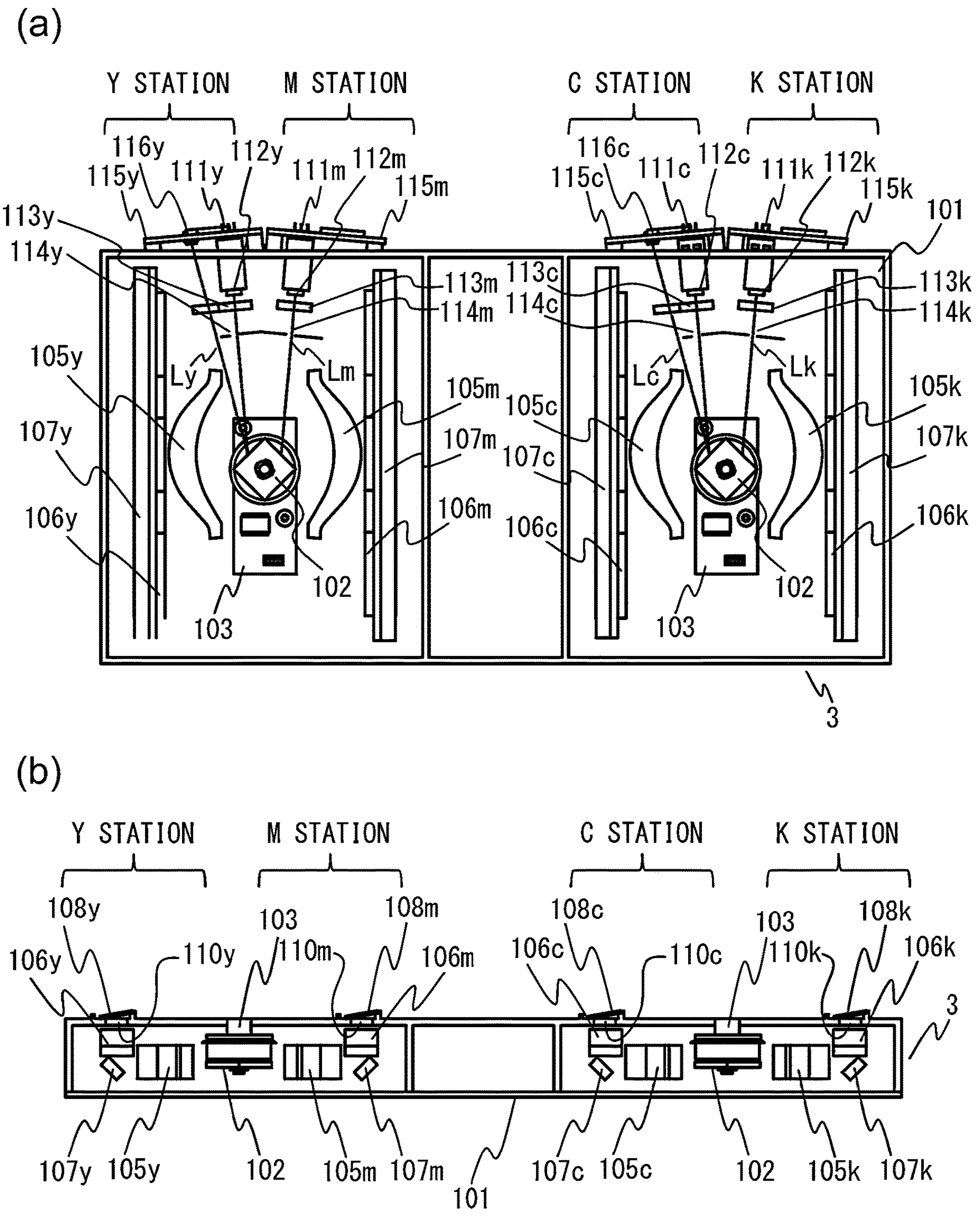

Part (a) and part (b) of FIG. 2 are schematic views showing a configuration of the optical scanning device according to the first and second embodiments.

Figure 3:
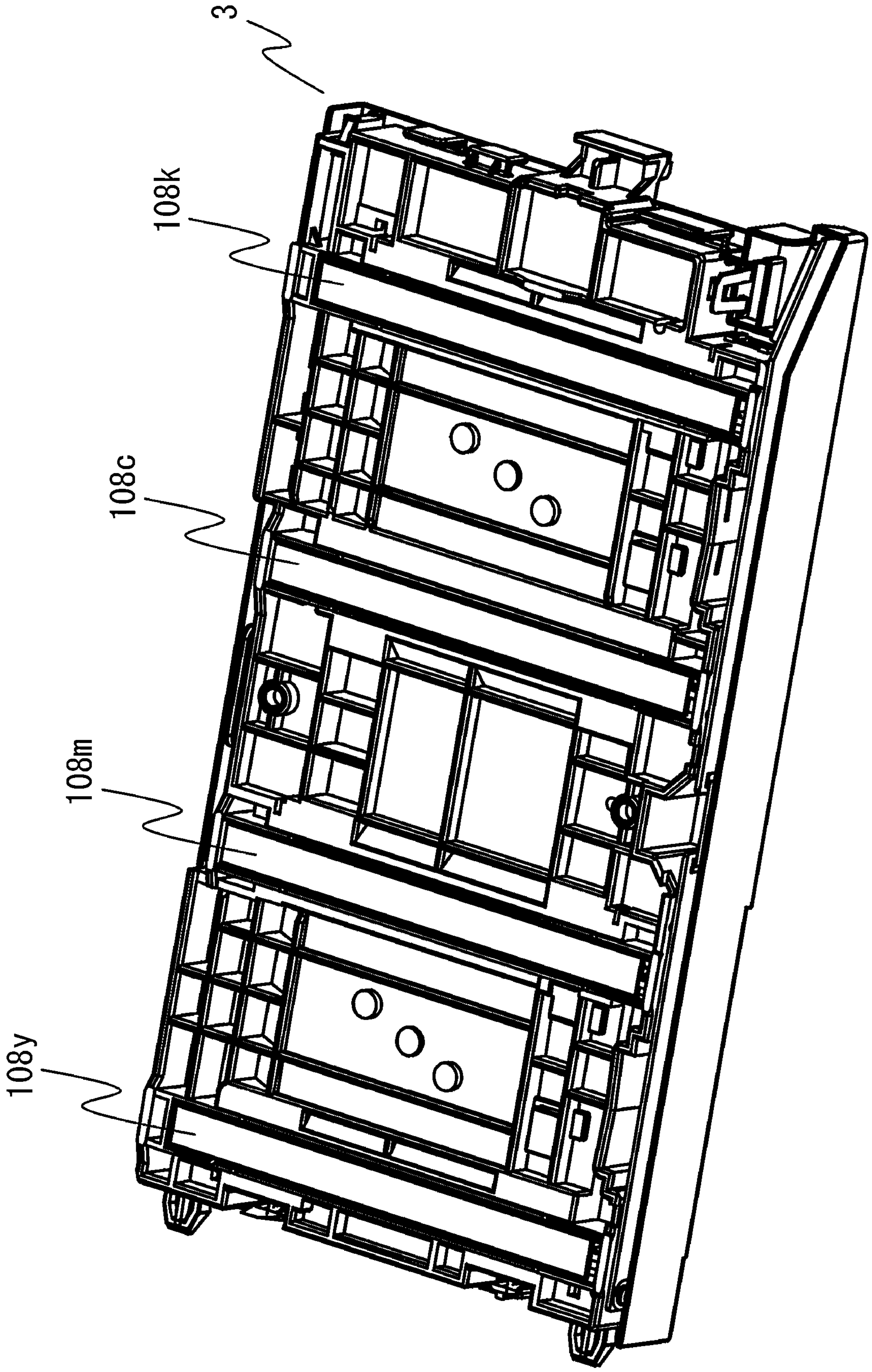

FIG. 3 is a schematic perspective view showing the configuration of the optical scanning device according to the first and second embodiments.

Figure 4:
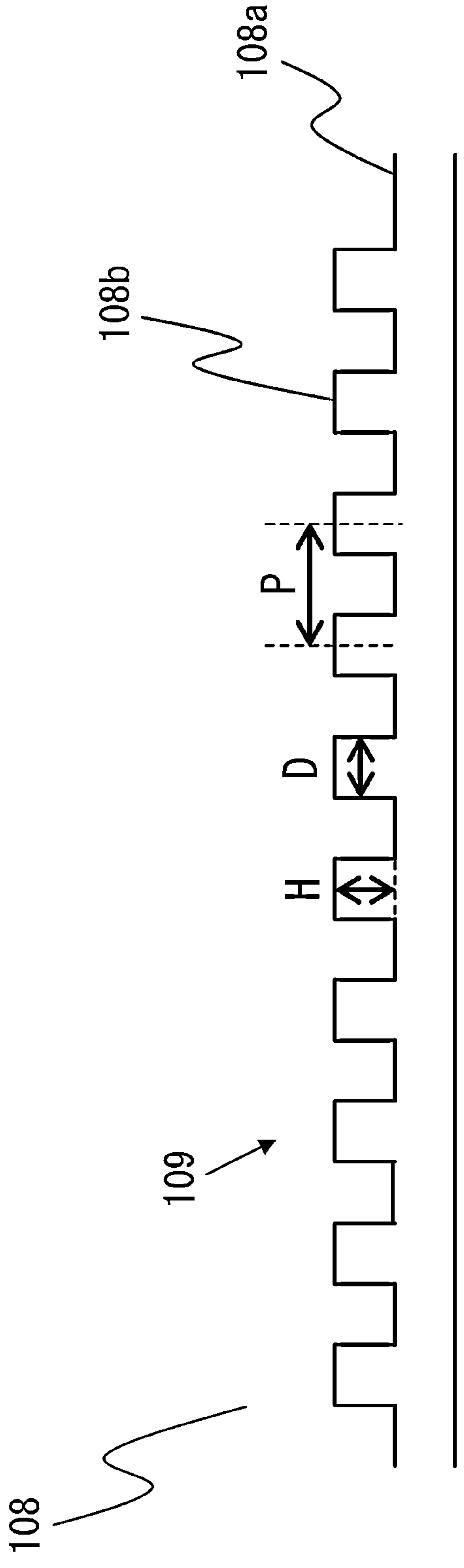

FIG. 4 is an enlarged cross-sectional view of a dustproof member according to the first embodiment.

Figure 5:
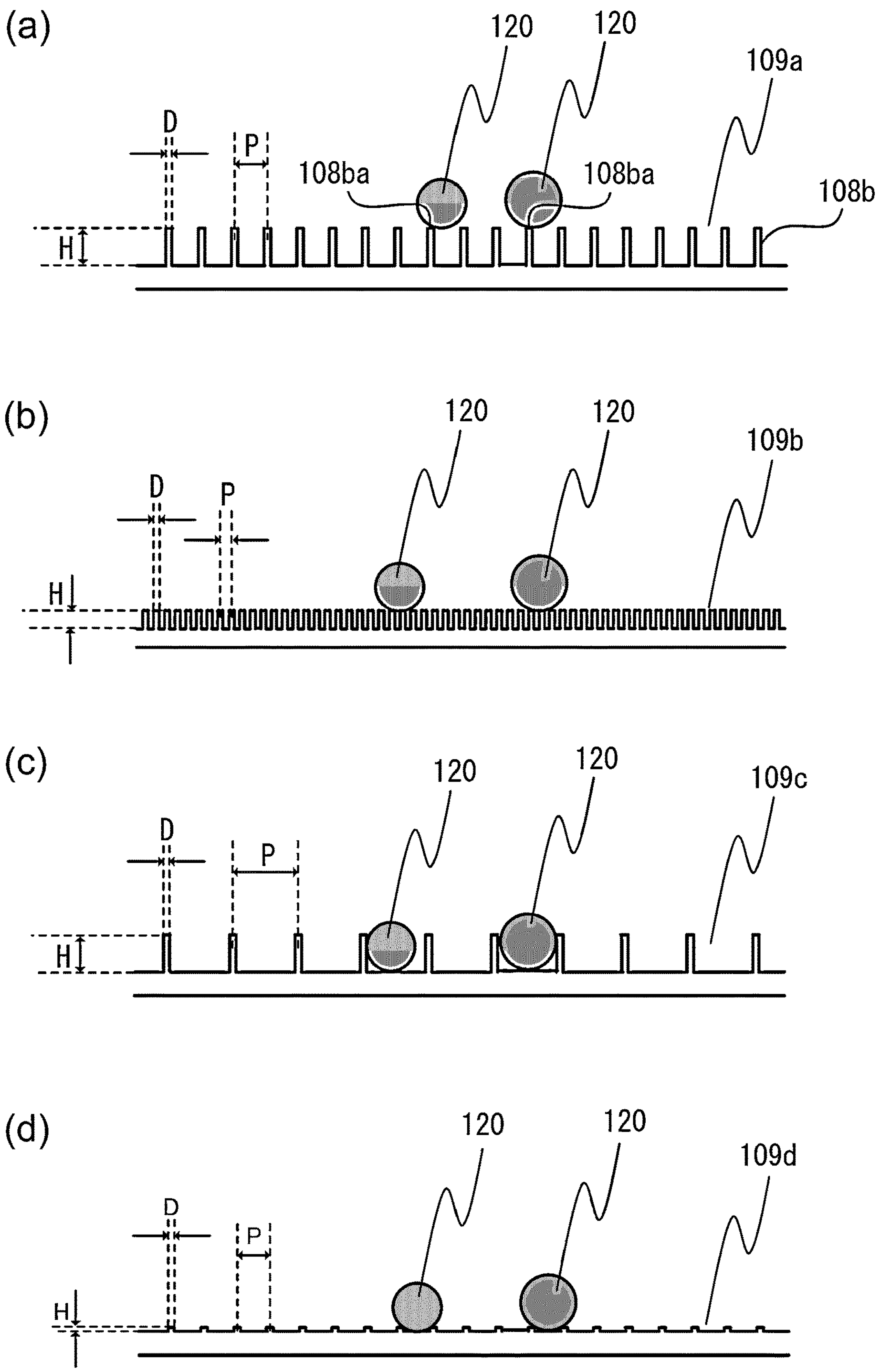

Part (a), part (b), part (c) and part (d) of FIG. 5 are enlarged cross-sectional views illustrating a configuration of the dustproof member according to the first embodiment.

Figure 6:
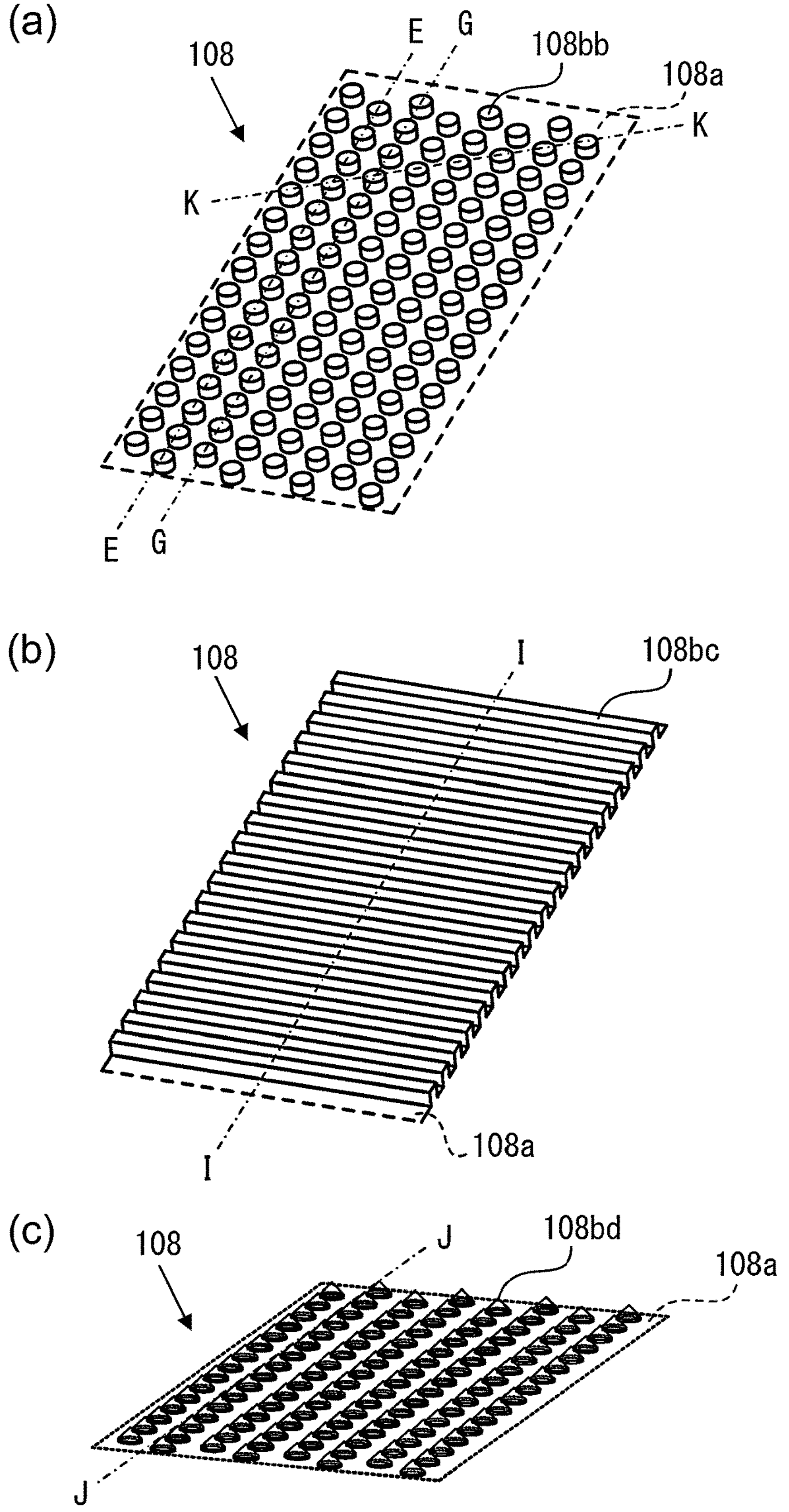

Part (a), part (b) and part (c) of FIG. 6 are schematic views showing a concavo-convex structure according to the first embodiment.

Figure 7:
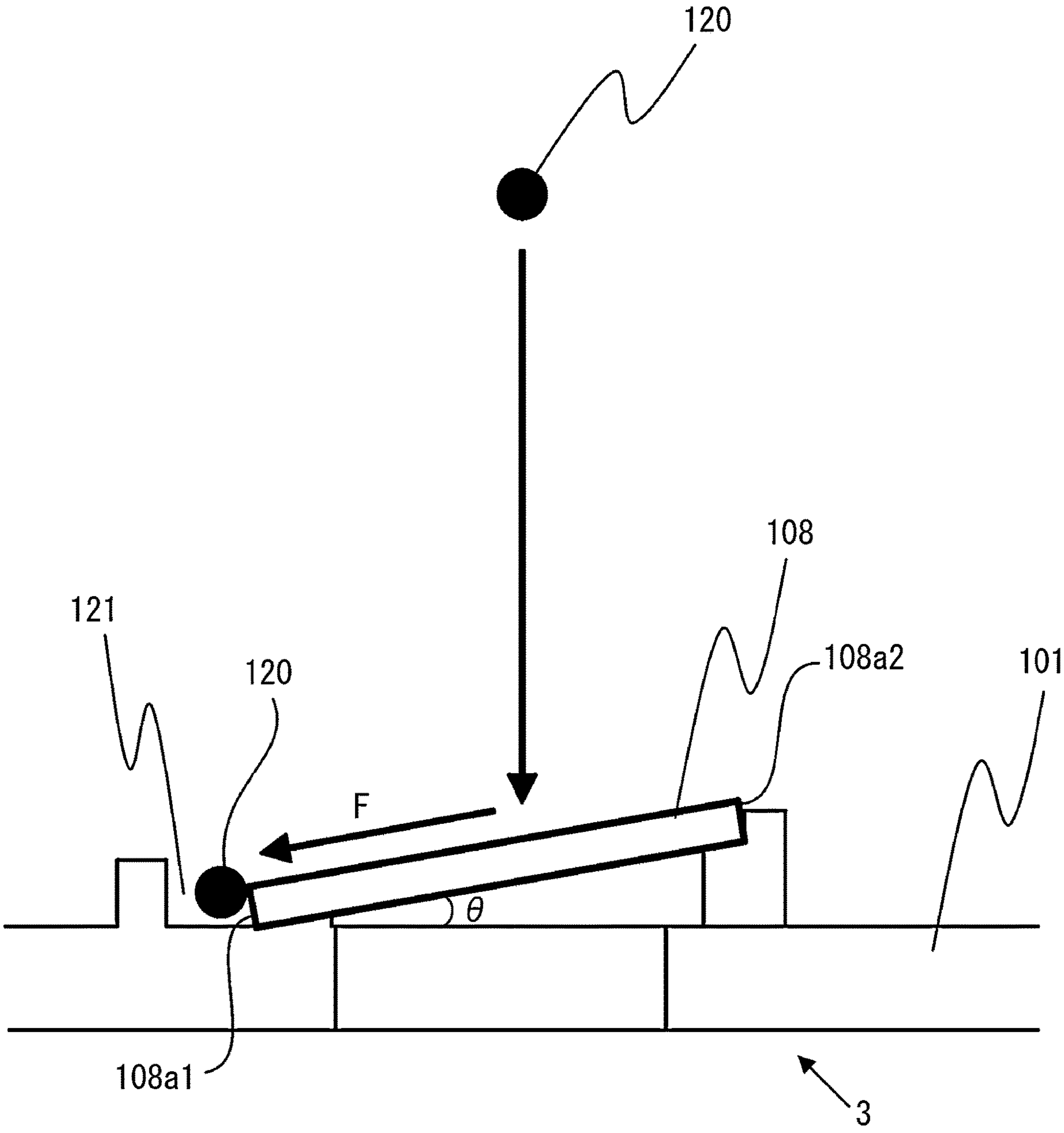

FIG. 7 is an enlarged cross-sectional view illustrating an effect of a dustproof plate according to the first embodiment.

Figure 8:
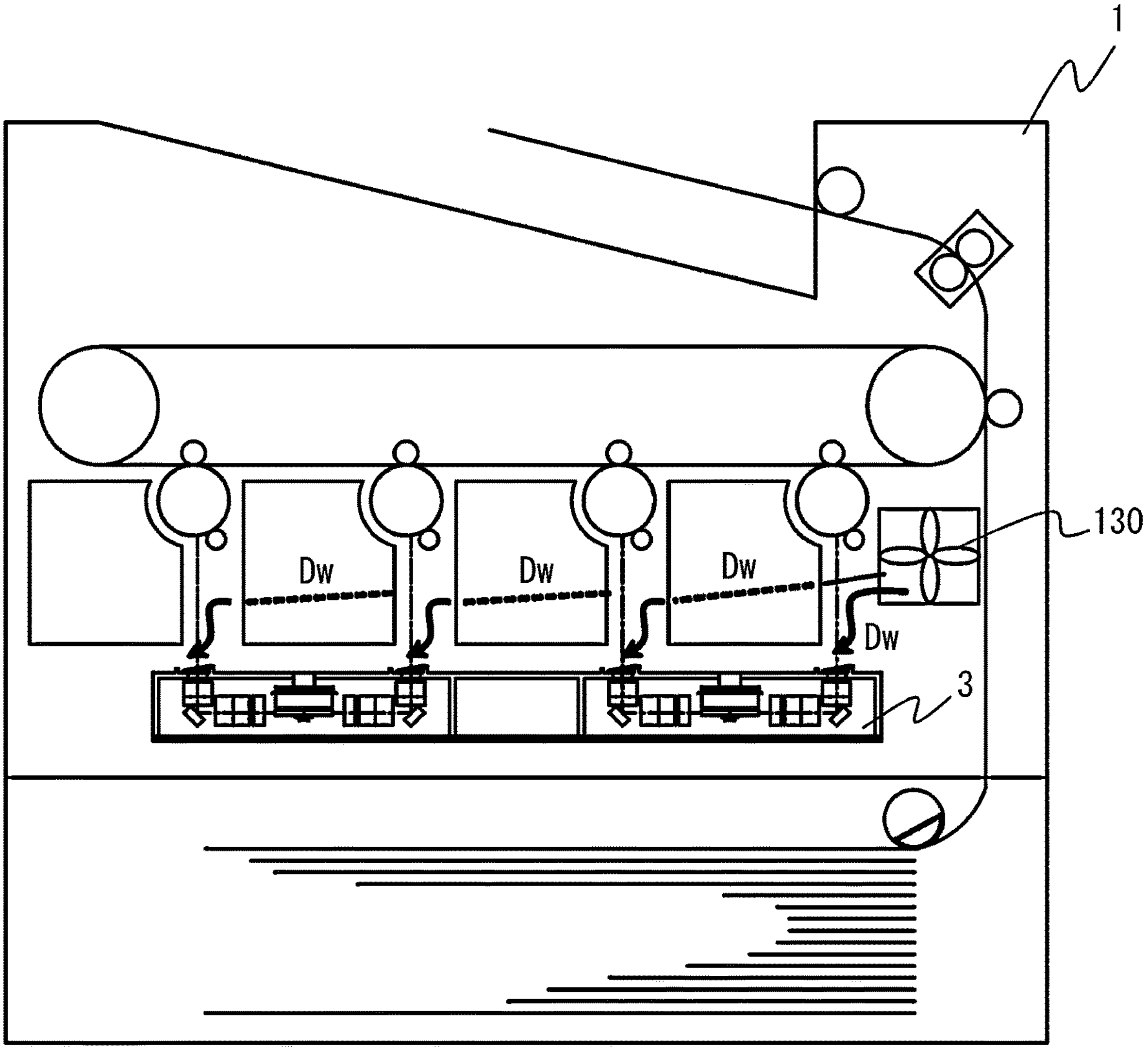

FIG. 8 is a cross-sectional schematic view of the image forming apparatus according to the first embodiment.

Figure 9:
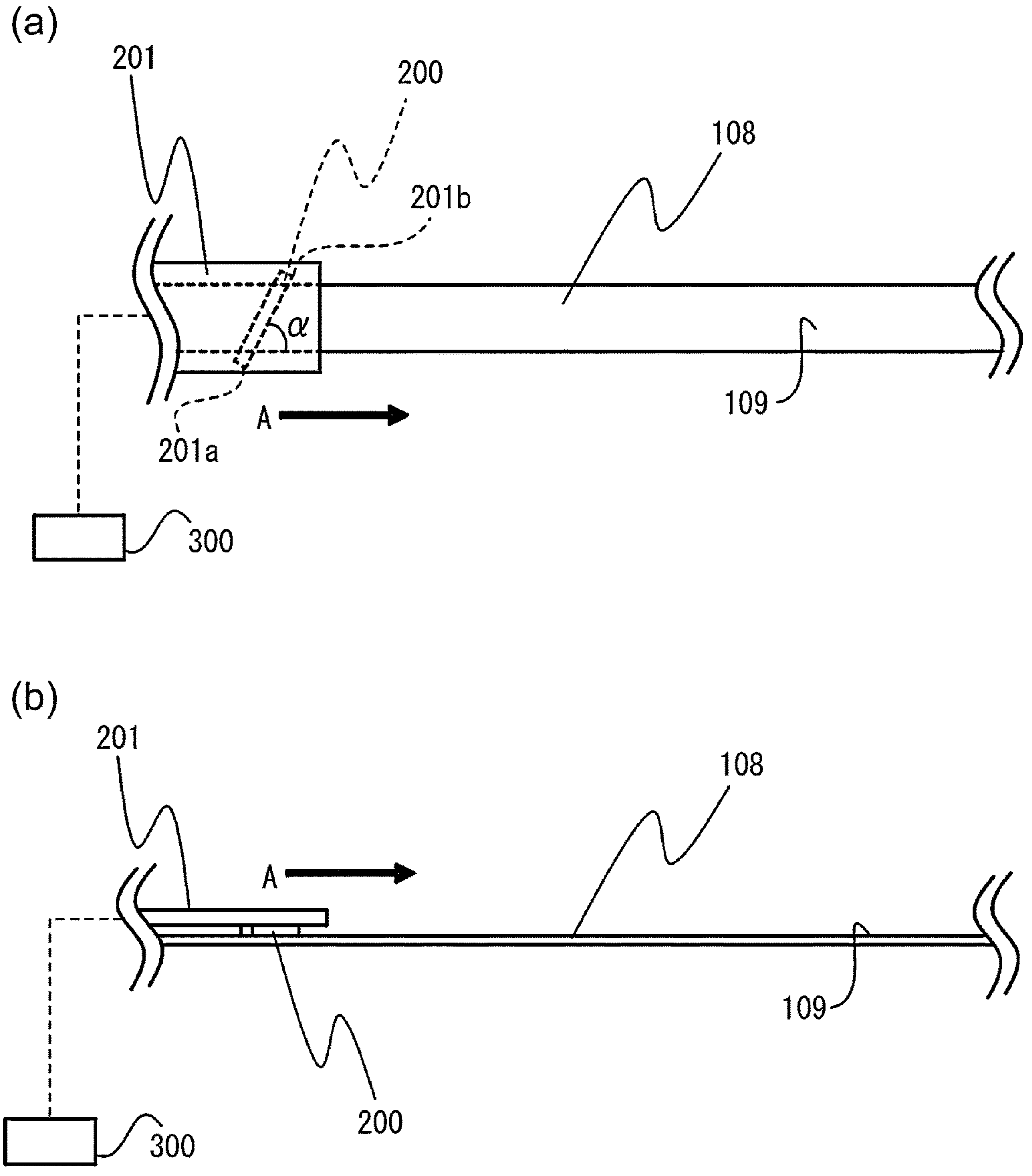

Part (a) and part (b) of FIG. 9 are schematic views showing a cleaning mechanism according to the second embodiment.

Figure 10:
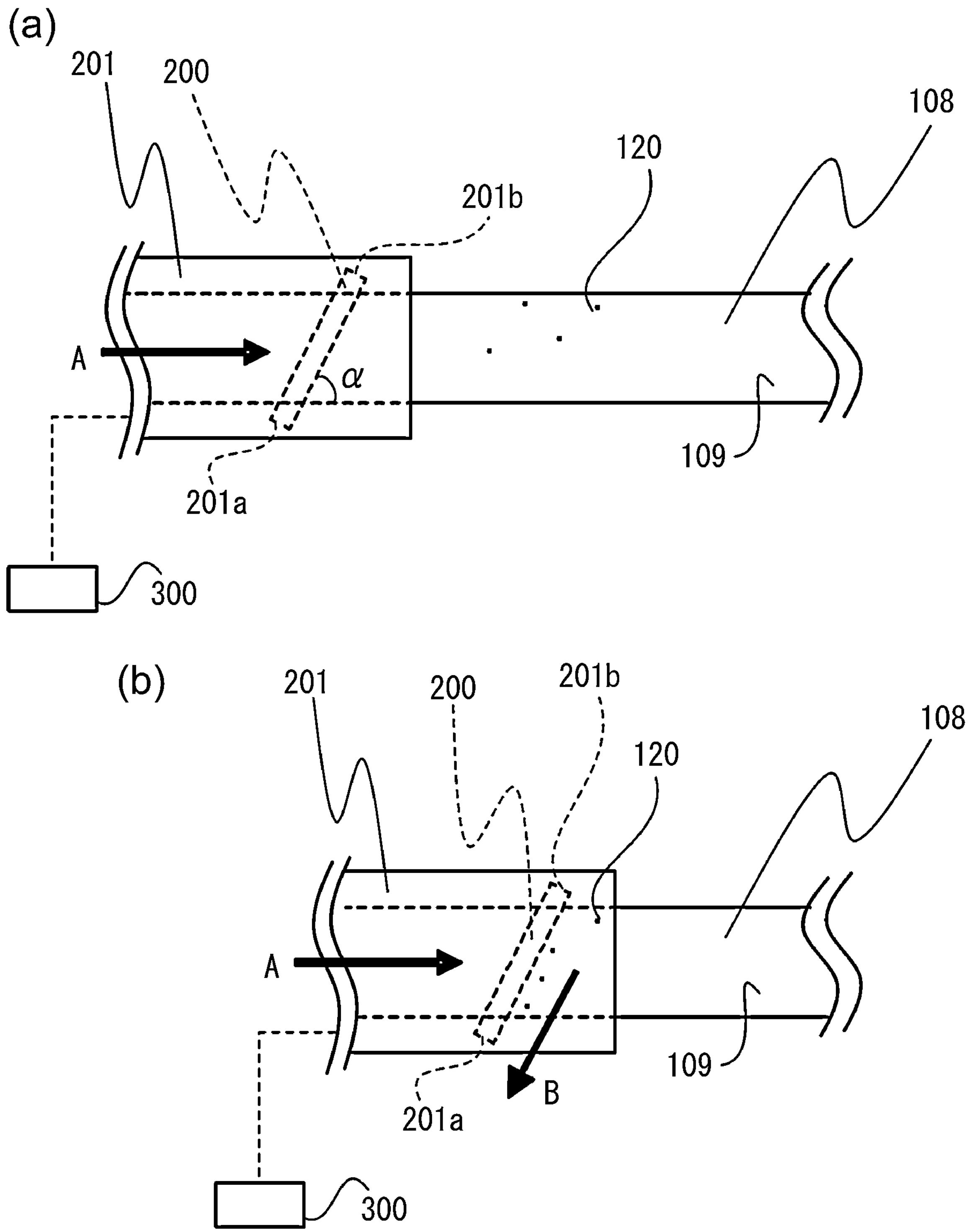

Part (a) and part (b) of FIG. 10 are schematic views illustrating the cleaning mechanism according to the second embodiment.

Figure 11:
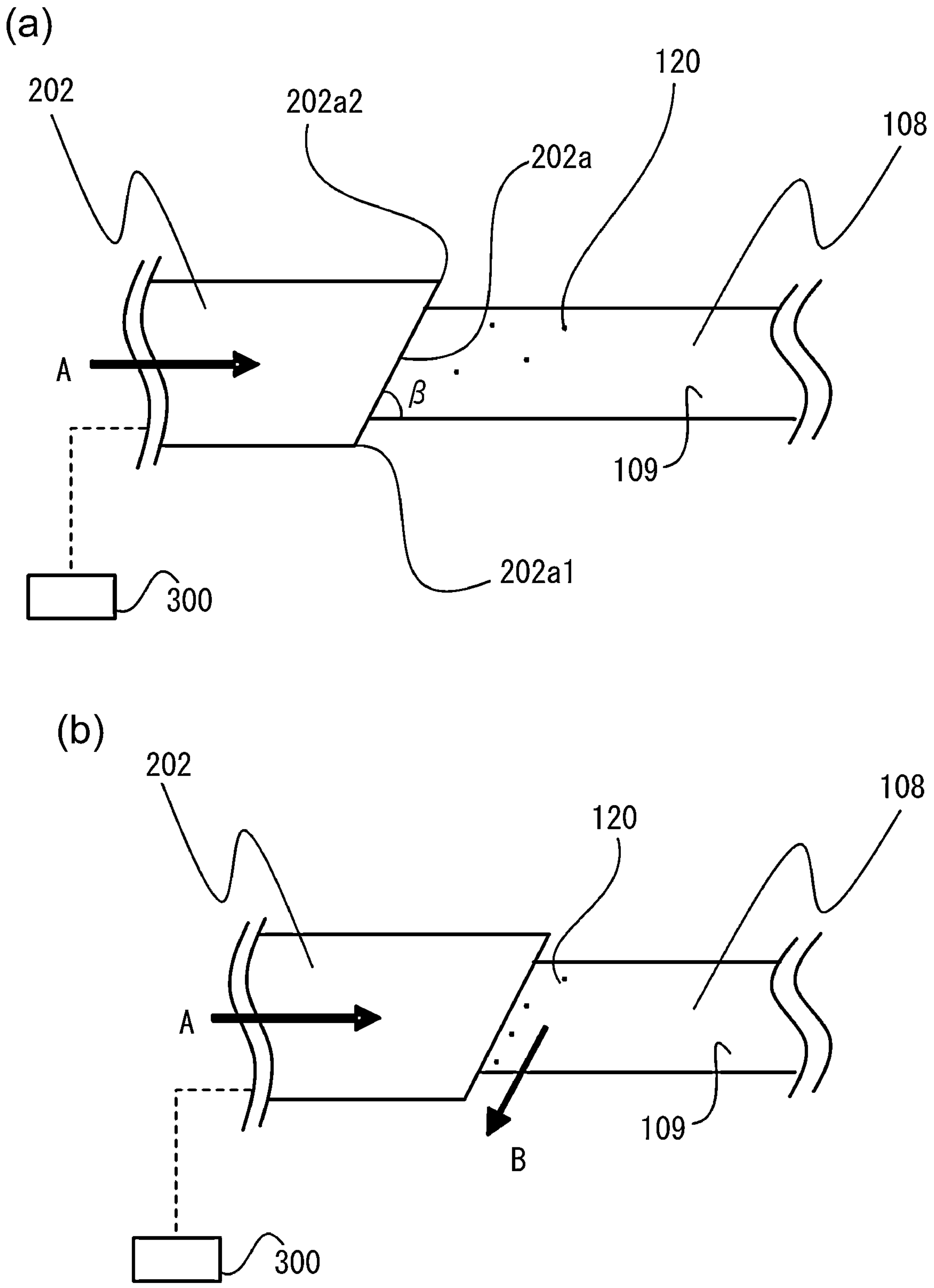

Part (a) and part (b) of FIG. 11 are schematic views illustrating the cleaning mechanism according to a modification of the second embodiment.

DESCRIPTION OF THE EMBODIMENTS

Embodiment 1

A configuration of a first embodiment of an image forming apparatus provided with an optical scanning device pertaining to the present invention will be described with reference to FIGS. 1 to 8. Incidentally, the dimensions, materials, shapes, relative arrangements and the like of components described in the following embodiments are not intended to limit the scope of the present invention to the following embodiments, unless specified otherwise <Image Forming Apparatus>

Figure 1:
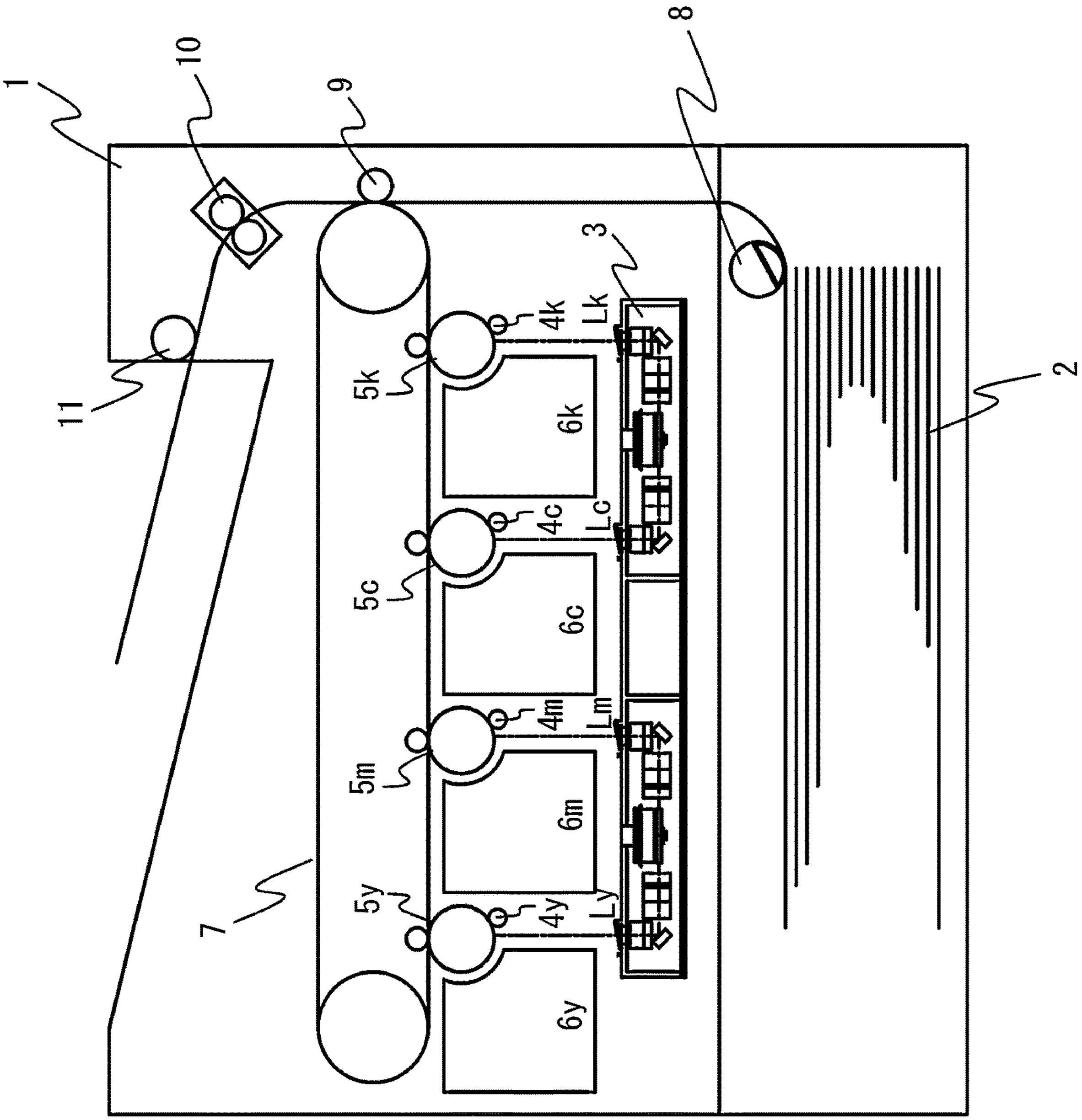
FIG. 1 is a cross-sectional schematic view showing a configuration of an image forming apparatus provided with an optical scanning device according to a first embodiment and a second embodiment.

A configuration of an image forming apparatus 1 will be described with reference to FIG. 1. FIG. 1 is a schematic sectional view of the image forming apparatus 1 according to a first embodiment. The image forming apparatus 1 is an electrophotographic color image forming apparatus that forms a toner image on a recording material 2 using toner (developer) with four colors: yellow Y, magenta M, cyan C and black K. The image forming apparatus 1 is provided with an optical scanning device 3. The optical scanning device 3 emits light flux Lk, Lc, Lm and Ly which are each light modulated based on image information and irradiates the surfaces of photosensitive drums 5*k*, 5*c*, 5*m* and 5*y* which are photosensitive members that are each uniformly charged by chargers 4*k*, 4*c*, 4*m* and 4*y* to form an electrostatic latent image. The electrostatic latent image formed on the surfaces of the photosensitive drums 5*k*, 5*c*, 5*m* and 5*y*, which are also scanned members, are respectively visualized into black, cyan, magenta and yellow toner images (developer images) by developing devices 6*k*, 6*c*, 6*m* and 6*y*, which are developing units. The visualized toner images are transferred onto a transfer belt 7 so that the black, cyan, magenta and yellow toner images are superimposed at a nip portion between the transfer belt 7 and the photosensitive drums 5*k*, 5*c*, 5*m* and 5*y* (primary transfer).

On the other hand, the recording material 2 stacked on a feed tray is fed by a feed roller 8 and conveyed to the nip portion between the transfer belt 7 and a transfer roller 9 as a transfer unit. The toner images primarily transferred onto the transfer belt 7 are then transferred onto the recording material 2 by the transfer roller 9 to form a color image (secondary transfer). The unfixed color image formed on the recording material 2 is heated and fixed by a fixing device 10 which includes an internal heater, then is discharged to outside of the apparatus by a discharge roller 11 or the like.

<Optical Scanning Device>

Next, a configuration of the optical scanning device 3 will be described with reference to FIGS. 2 and 3. Part (a) of FIG. 2 is a schematic top view showing the configuration of the optical scanning device 3. Part (b) of FIG. 2 is a cross-sectional schematic view showing the configuration of the optical scanning device 3.

The optical scanning device 3 of the first embodiment is a unit mounted on a tandem-type color image forming apparatus, and is fixed to the frame of the image forming apparatus 1 described above by fixing members such as springs or screws (not shown). Incidentally, in the following description, for convenience, scanning optical systems corresponding to the respective colors will be referred to as Y, M, C and K stations. Incidentally, since the configurations and optical effects of the Y and M stations are the same as those of the C and K stations, the configurations and optical effects of the Y and M stations will mainly be described in the following description. Incidentally, suffixes y, m, c and k in the following reference numerals represent the colors yellow, magenta, cyan, and black respectively, and may be omitted when the color is not specified.

The light flux Ly emitted from a semiconductor laser 111*y* is collimated by a collimator lens 112*y* and enters a cylindrical lens 113*y*. The substantially parallel light flux incident on the cylindrical lens 113*y* is emitted as it is as a parallel light flux in a main scanning section, the light quantity is limited by an aperture stop 114*y*, and the light is deflected by scanner motors 103 provided with a rotatable polygon mirror 102 as a deflection unit. The deflected light flux Ly passes through a first scanning lens 105*y*, has its optical path deflected by a folding mirror 107*y*, then passes through a second scanning lens 106*y* and a dustproof plate 108*y* as a light transmissive member, thereby being scanned at a uniform speed while forming a spot image on the photosensitive drum 5*y*. At the Y station, the light flux Ly is incident on a beam detector (hereinafter referred to as BD) 116*y*, a signal (hereinafter referred to as BD signal) is output from the BD 116*y* to a control unit (not shown), and the control unit controls the writing position of the light flux Lm, described later, in the main scanning direction based on the BD signal. The semiconductor laser 111*y* and the BD 116*y* are mounted on a substrate 115*y*.

The light flux Lm emitted from a semiconductor laser 111*m* disposed alongside the semiconductor laser 111*y* similarly passes through a collimator lens 112*m*, a cylindrical lens 113*m* and an aperture stop 114*m*. Thereafter, the light flux Lm is deflected by a different surface of the rotatable polygon mirror 102 that is adjacent to the surface which deflects the light flux Ly. In the M station, the light flux Lm is not incident on the BD 116*y*.

The deflected light flux Lm passes through a first scanning lens 105*m*, a folding mirror 107*m*, a second scanning lens 106*m* and a dustproof plate 108*m*, and is guided to the photosensitive drum 5*m*. The dustproof plates 108*y* and 108*m*, which are dustproof members, are transparent members and prevent toner dropped from the developing devices 6 or the transfer belt 7 and dust entering from the outside from entering inside the optical scanning device 3. In the optical scanning device 3, substrates 115 are attached to the outside of the side surface of a casing 101, and optical member groups, such as the above-mentioned lenses and mirrors, and the scanner motors 103 are attached to the inside of the casing 101.

(Dustproof Plates)

FIG. 3 is a schematic perspective view of the optical scanning device 3. The optical scanning device 3 has emitting ports 110*y*, 110*m*, 110*c* and 110*k* (see part (b) of FIG. 2) as openings through which the light flux Ly, Lm, Lc and Lk emit light. Dustproof plates 108*y*, 108*m*, 108*c* and 108*k* are attached to the emitting ports 110*y*, 110*m*, 110*c* and 110*k*, respectively. The dustproof plates 108 in the first embodiment are long resin plates, and the dustproof plates 108 are fixed to the optical scanning device 3 by an adhesive means such as double-sided tape, adhesive or hot melt. The dustproof plates 108 may be attached by elastic members such as springs. By attaching the dustproof plates 108 to the emitting ports 110, the inside of the optical scanning device 3 can be substantially sealed, and contamination of optical parts such as the above-mentioned lenses and folding mirrors can be prevented. Incidentally, the dustproof plates 108 are disposed so that a longitudinal direction of the dustproof plates 108 is disposed along the direction in which the light flux L are scanned by the rotatable polygon mirror 102, i.e., a longitudinal direction of the optical member group (hereinafter referred to as a scanning direction, main scanning direction and the like).

<Configuration of the Dustproof Plates>

Next, a characteristic structure according to the first embodiment will be described with reference to FIG. 4. FIG. 4 is a cross-sectional enlarged view of the dustproof plates 108. The dustproof plates 108 have a base surface 108*a* on which a plurality of fine projected portions 108*b* are provided. In the first embodiment, a height H of the projected portions 108*b* of this fine convex structure is 0.5 μm, and a width D of the projected portions 108*b* is 0.2 μm. Further, a pitch P, which is the distance between a center (center portion) of one of the projected portions 108*b* and a center (center portion) of the projected portion 108*b* adjacent to the one of the projected portions 108*b*, is set to 0.4 μm. The structure of the dustproof plates 108 in the first embodiment is set to be concavo-convex structures 109.

Incidentally, the height H, the width D and the pitch P of the projected portions 108*b* are preferably 1 μm or less. Furthermore, the width D of the projected portions 108*b* is preferably equal to or less than the wavelength of the laser used. However, the height H, the width D and the pitch P of the projected portions 108*b* are not limited to these ranges, and the shape of the projected portions 108*b* may be such that the contact area with powder such as toner and particles such as dust is minimized.

<Sliding Effect>

Next, a powder sliding effect will be described with reference to part (a) to part (c) of FIG. 5. Part (a) to part (c) of FIG. 5 show examples of the relationship between the powder and the concavo-convex structures 109*a* to 109*c* having various heights H and pitches P. Incidentally, the size of the projected portions is exaggerated for the purpose of explanation in the Figure.

Part (a) of FIG. 5 shows the relationship between the dustproof plates 108 and powder 120 such as dust or toner when the projected portions 108*b* of the concavo-convex structure 109*a* have a height H, width D and pitch P that are 1 μm or less. Incidentally, the general size of toner has a number average particle size of 3 to 10 μm. Considering the variation in particle size at this time, the particle size distribution is about 2 to 15 μm. Therefore, the concavo-convex structures are molded assuming a toner particle size of 2 to 15 μm. As shown in part (a) of FIG. 5, when the height H, the width D and the pitch P of the projected portions 108*b* are within the above-mentioned range, a connecting point between the surface of the dustproof plates 108 and the powder 120 is limited to tips 108*ba* of the projected portions 108*b*, and the contact area with the powder 120 is reduced. Therefore, the adhesion force of the powder 120 is also reduced, and a sliding effect can be obtained.

Part (b) of FIG. 5 shows the relationship between the dustproof plates 108 and the powder 120 when the pitch P of the projected portions 108*b* is extremely small with respect to the powder. As shown in part (b) of FIG. 5, if the pitch P of the projected portions 108*b* is extremely small, the number of connecting points between the powder 120 and the concavo-convex structure 109*b* increases, reducing the sliding effect of the powder 120. For this reason, it is desirable for the pitch P to be 0.1 μm or more.

Part (c) of FIG. 5 shows the relationship between the dustproof plates 108 and the powder 120 when the pitch P of the projected portions 108*b* of the concavo-convex structure 109*c* is larger than the powder. As shown in part (c) of FIG. 5, if the pitch P is larger than the powder, the powder 120 will enter into a concave portion formed between one of the projected portions 108*b* and the projected portion 108*b* adjacent to the one of the projected portions 108*b*, reducing the sliding effect of the powder 120. For this reason, it is preferable that the pitch P of the projected portions 108*b* is 1 μm or less, assuming the size of the powder such as toner and dust ($P \leq 1$ μm). Therefore, it is preferable that the pitch P is 0.1 μm or more and 1 μm or less.

Part (d) of FIG. 5 shows the relationship between the dustproof plates 108 and the powder 120 when the height H of the projected portions 108*b* of the concavo-convex structure 109*d* is significantly smaller than the pitch P. As shown in part (d) of FIG. 5, when the height H of the projected portions 108*b* is shallower (smaller) than the pitch P, the number of connecting points between the powder 120 and the concavo-convex structure 109*d* also increases. For this reason, it is preferable that the height H of the projected portions 108*b* is greater than the pitch P of the projected portions 108*b* ($H > P$). Further, although not shown, when the width D of the projected portions 108*b* is widened, the contact area between the powder and the concavo-convex structures similarly increases, reducing the sliding effect of the powder. Therefore, it is preferable that the width D of the projected portions is ½ of the pitch P or less ($D \leq \frac{1}{2}P$).

<Concavo-Convex Structures>

Part (a) to part (c) of FIG. 6 are views showing the shapes of the projected portions when a plurality of projected portions spaced apart from each other are provided on the base surface 108*a*. Part (a) of FIG. 6 is a view showing cylindrical projected portions 108*bb*. The cylindrical projected portions 108*bb* may have a bottom diameter corresponding to the width D in FIG. 4 and a height H and a diameter (width D) of the cylinder within the above-mentioned range. Further, in a longitudinal cross section of the dustproof plates 108, i.e., in an E-E cross section and a G-G cross section, the interval between adjacent cylinders (the projected portions 108*bb*) may correspond to the pitch P described in FIG. 4 and the pitch P may be within the above-mentioned range. Furthermore, the pitch P may also be in the above-mentioned range in a K-K cross section, which is a cross section in a direction intersecting the longitudinal direction of the dustproof plates 108. Incidentally, the cross section in the direction intersecting the longitudinal direction of the dustproof plates 108 may be other than the K-K cross section. In part (a) of FIG. 6, a plurality of projected portions 108*bb* that are isolated from one another are disposed two-dimensionally.

Part (b) of FIG. 6 is a view showing striped projected portions 108*bc* formed by repeating rib shapes. The rib-shaped projected portions 108*bc* may have a height H and a width D of each projected portion 108*bc* that is within the above-mentioned range. Further, in the longitudinal cross section of the dustproof plates 108, i.e., in an I-I cross section, the interval between adjacent projected portions 108*bc* may correspond to the pitch P described with reference to FIG. 4, and the pitch P may be within the above-mentioned range.

Furthermore, any shape can be selected, such as conical projected portions 108*bd* as shown in part (c) of FIG. 6. The conical projected portions 108*bd* may have a bottom diameter corresponding to the width D in FIG. 4, and the height H and diameter (width D) of the cones may be within the above-mentioned range. Further, in the longitudinal cross section of the dustproof plates 108, i.e., in a J-J cross section, the interval between the apexes of adjacent cones (projected portions 108*bb*) may correspond to the pitch P described in FIG. 4, and the pitch P may be within the above-mentioned range. Furthermore, as in a K-K cross section in part (a) of FIG. 6, the pitch P may also be within the above-mentioned range in the cross section intersecting the longitudinal direction of the dustproof plates 108. Incidentally, the cross section in the direction intersecting the longitudinal direction of the dustproof plates 108 may be a cross section other than the K-K cross section. In part (c) of FIG. 6, a plurality of projected portions 108*bd* that are isolated from one another are disposed two-dimensionally.

In this way, the concavo-convex structures may have a shape that minimizes the connecting points with the powder. Incidentally, the dustproof plates 108 in the first embodiment are made of a resin, and are preferably made of cycloolefin polymer (COP), acrylic (PMMA) or the like. Incidentally, the dustproof plates 108 may also be made of a thermoplastic material such as polystyrene, polycarbonate, polypropylene or polyethylene. Further, the dustproof plates 108 may be constituted of a material such as glass. A film may be formed on the surface of the material such as glass, and the concavo-convex structures may be provided on the film.

(Manufacturing the Concavo-Convex Structures)

The fine concavo-convex structures made of a resin are transferred onto the surface of a molded product by providing the concavo-convex structures on a core mold used in general injection molding. A laser processing machine is used to form the concavo-convex structures of the core mold, and a laser light is emitted to the core mold to form a concavo-convex structure with each pulse. The laser light may, for example, be infrared light having a wavelength of 1064 nm and a laser with a pulse width of femtoseconds may be used, but other lasers may also be used.

When forming a film on a material such as glass and providing the film with a concavo-convex structure, the glass surface may be coated with polysilazane or the like, and a mold having a fine concavo-convex structure may be pressed against the film to transfer the structure.

<Attaching the Dustproof Plates>

Next, an attachment structure of the dustproof plates 108 will be described with reference to FIG. 7. FIG. 7 is a sectional view of the dustproof plates 108 in a short side direction (direction perpendicular to the longitudinal direction), and is an enlarged cross-sectional view showing a state in which the powder 120 such as toner has fallen onto the dustproof plates 108. The dustproof plates 108 are installed to be inclined (angle θ) with respect to a horizontal direction. In the first embodiment, the dustproof plates 108 are attached with inclination by an angle θ relative to the casing 101 of the optical scanning device 3 which is installed horizontally; however, the dustproof plates 108 may be attached with inclination by the angle θ=0° with respect to the optical scanning device 3, and the optical scanning device 3 itself may be installed with inclination relative to the horizontal.

Since the dustproof plates 108 are installed with inclination (angle θ), particles such as the powder 120, such as toner that cannot be held by the developing devices 6 or the like and fall, do not remain on the dustproof plates 108 and slide down due to its own weight (arrow F). Further, by providing a groove-shaped retention portion 121 (groove portion) on the casing 101 to retain the powder 120 such as toner or dust that has slid down, the risk of the powder 120 moving to another location and causing a malfunction can be reduced.

More specifically, one end portion in the short side direction of the dustproof plates 108 is referred to as an end portion **108*a*1, and an other end portion in the short side direction is referred to as an end portion 108*a*2. As a result, as shown in FIG. 7, when the dustproof plates 108 are viewed in the longitudinal direction, the end portion 108*a*2 is higher than the end portion 108*a*1, and the retention portion 121 is provided on the end portion 108*a*1** side (the lower end portion).

<Fan>

Next, a configuration for further suppressing adhesion of foreign matter to the dustproof plates 108 will be described with reference to FIG. 8. FIG. 8 is a schematic sectional view of the image forming apparatus 1, with reference numerals denoting main parts. The image forming apparatus 1 includes a fan 130 as a blowing unit for both in-machine cooling and in-machine cleaning.

The fan 130 is provided mainly for cooling electrical components that are likely to affect operation and performance during printing operations, and parts that are likely to deteriorate due to temperature increases. Further, the fan 130 may also be provided to clean portions that may become contaminated with dust, paper powder, toner or the like, causing image defects or the like. In the first embodiment, the image forming apparatus 1 is also provided with a fan 130 for the latter purpose of cleaning.

The fan 130 generates an air flow Dw. Incidentally, the image forming apparatus 1 may be provided with a duct (not shown) which is a guidance unit to form an air path that guides the air flow Dw generated by the fan 130 onto each dustproof plate 108 via a duct or the like, thereby guiding the air flow Dw. By forming the air flow Dw above the dustproof plates 108, even if toner, dust and the like do not completely slide off the dustproof plates 108 and remain on the dustproof plates 108, they can be removed with a light amount of air.

Incidentally, in FIG. 7, the powder 120 falls onto the dustproof plates 108, slides down the dustproof plates 108 in the direction of the arrow F with its own weight and remains in the retention portion 121. For example, if the fan 130 is disposed on the side opposite to the position shown in FIG. 8, i.e., if the fan 130 is disposed on the left side, the air flow will be opposite to that shown in FIG. 8. In this case, the powder 120 can move on the dustproof plates 108 against the direction of gravity from the lower end portion **108*a*1 to the higher end portion 108*a*2. For this reason, when the dustproof plates 108 are viewed in the longitudinal direction, the retention portion 121 may be provided on the side of the end portion 108*a*2 which is higher than the end portion 108*a*1** (the higher end portion).

As described above, according to the present configuration, it is possible to prevent foreign matter such as toner and dust from adhering to the optical path of the optical scanning device, thereby providing a high-quality image forming apparatus that is free of image defects caused by the adhesion of foreign matter.

As described above, according to the first embodiment, foreign matter such as dust and toner adhering to the dustproof members of the optical scanning device can be easily removed.

Embodiment 2

Next, a configuration of a second embodiment of the image forming apparatus pertaining to the present invention will be described. Incidentally, the same reference numerals are used to denote members configured in the same manner as in the first embodiment. Alternatively, the same names are used for these members even they are denoted by different reference numerals, and descriptions thereof will be omitted.

<Cleaning Mechanism of the Dustproof Plates>

A configuration for further suppressing adhesion of foreign matter to the dustproof plates 108 using a unit different from the method shown in FIG. 8 of the first embodiment will be described with reference to FIG. 9. FIG. 9 is a schematic view showing a cleaning mechanism for cleaning foreign matter adhering to the dustproof plates 108. Part (a) of FIG. 9 is a top view, and part (b) of FIG. 9 is a sectional view.

A cleaning unit 200 as a cleaning member is in contact with the dustproof plates 108, and the cleaning unit 200 is held by a holding portion 201. More specifically, the cleaning unit 200 is in contact with the surface of the dustproof plates 108 on which the concavo-convex structures 109 are provided. Further, the cleaning unit 200 is provided so as to be at an angle α with respect to the longitudinal direction (arrow A). For this reason, in the cleaning unit 200, one end portion **201*a* in the short side direction of the dustproof plates 108 and an other end portion 201*b* are located at different positions in the longitudinal direction of the dustproof plates 108**.

The holding portion 201 can be slid in the longitudinal direction (arrow A) of the dustproof plates 108 by a driving mechanism 300 which is a driving unit that drives the holding portion 201. Due to the angle α described above, when the holding portion 201 moves in the direction of the arrow A, the end portion 201*b* precedes the end portion 201*a*. The cleaning unit 200 in the second embodiment is preferably made of non-woven fabric, felt, sponge or the like.

<Cleaning Operation of the Dustproof Plates>

Next, a cleaning operation will be described with reference to FIG. 10. Part (a) of FIG. 10 shows the state of the dustproof plates 108 prior to cleaning, with the powder 120 such as toner (black dots) remaining on the dustproof plates 108. Part (b) of FIG. 10 shows the state during cleaning in which the cleaning unit 200 moves integrally with the holding portion 201 in the direction of the arrow A, and the cleaning unit 200 proceeds while scraping off the powder 120 such as toner (black dots).

In this case, the cleaning unit 200 is not perpendicular to the direction of the arrow A but intersects the dustproof plates 108 at the angle α so that the scraped toner is discharged in the direction of an arrow B. Incidentally, by providing the retention portion 121 described with reference to FIG. 7 in the direction of the arrow B, the risk of the powder 120 moving to another location and causing a malfunction can be reduced. In this manner, the cleaning unit 200 is provided at the angle α with respect to the longitudinal direction in order to move the scraped powder 120 to the retention portion 121, i.e., to move the scraped powder 120 in the direction of the arrow B. More specifically, the cleaning unit 200 is provided at the angle α so that when the cleaning unit 200 proceeds in the direction of the arrow A, the end portion 201*b*, which is farther from the retention portion 121 in the short side direction, proceeds ahead of the end portion 201*a*, which is closer to the retention portion 121 in the short side direction. Incidentally, an angle may be provided so that when the holding portion 201 proceeds in the direction of the arrow A, the end portion 201*a* proceeds ahead of the end portion 201*b*. In this case, the retention portion 121 may be provided on the end portion 201*b* side.

Further, the cleaning unit 200 in the second embodiment has a structure in which fibers such as non-woven fabric are entangled so that the cleaning unit 200 can entangle any toner that cannot be discharged. In the second embodiment, the dustproof plates 108 have the above-mentioned fine convex shape (the concavo-convex structures 109) so that foreign matter such as toner and dust is less likely to adhere to the dustproof plates 108. Therefore, the cleaning unit 200 constituted of fibers such as non-woven fabric can provide sufficient cleaning ability with a biasing force that brings it into slight contact with the dustproof plates 108. Further, by inclining the cleaning unit 200 by an installation angle (angle α) with respect to the traveling direction, a scraping effect in a direction perpendicular to the traveling direction can be obtained. This eliminates the need to provide a biasing member for strongly biasing the cleaning unit 200 against the dustproof plates 108, and makes it possible to realize a cleaning mechanism with an inexpensive configuration.

Modification of the Second Embodiment

Next, a modification of the cleaning mechanism described in the second embodiment will be described with reference to FIG. 11. The difference from FIG. 10 is a configuration of a cleaning unit 202 as a cleaning unit. The cleaning unit 202 in FIG. 11 is made of a material such as rubber and functions as a blade. As a blade, the cleaning unit 202 is preferably made of elastic rubber, graphite, silicone rubber or the like, but can be substituted with a resin. In the second embodiment, the cleaning unit 202 is driven in the direction of the arrow A by the driving mechanism 300.

Part (a) of FIG. 11 shows the state prior to cleaning the dustproof plates 108, with toner (black dots) remaining on the dustproof plates 108. Part (b) of FIG. 11 shows the state during cleaning in which the cleaning unit 202 moves in the direction of the arrow A, and the cleaning unit 202 proceeds while scraping off the powder 120 such as toner (black dots). In this case, a tip 202*a* of the cleaning unit 202 intersects with the dustproof plates 108 at an angle β with respect to the direction of the arrow A rather than perpendicularly, thereby discharging the scraped toner in the direction of the arrow B. More specifically, the tip 202*a* of the cleaning unit 202 in the traveling direction (direction of the arrow A) has the angle β with respect to the direction of the arrow A.

While the cleaning unit 202 moves in the longitudinal direction, the tip 202*a* is not perpendicular to the longitudinal direction within a plane parallel to the dustproof plates 108. In this case, if the angle β is less than 10°, it becomes difficult to discharge the powder 120 in the direction of the arrow B, therefore it is preferable that the tip angle of the blade is 10° or more (β≥10°). Incidentally, by providing the retention portion 121 described with reference to FIG. 7 in the direction of the arrow B, the risk of the powder 120 moving to another location and causing a malfunction can be further reduced.

More specifically, the tip 202*a* of the cleaning unit 202 is provided at an angle β so that when the tip 202*a* proceeds in the direction of the arrow A, an end portion 202*a*2, which is farther from the retention portion 121 in the short side direction, proceeds ahead of an end portion 202*a*1, which is closer to the retention portion 121 in the short side direction. Incidentally, when the cleaning unit 202 proceeds in the direction of the arrow A, an angle may be provided so that the end portion 202*a*1 proceeds ahead of the end portion 202*a*2. In this case, the retention portion 121 may be provided on the end portion 202*a*2 side.

By using a cleaning mechanism with a blade, in the modification, the dustproof plates 108 have the fine convex shapes (concavo-convex structures 109) described above so that foreign matter such as toner and dust is less likely to adhere to the dustproof plates 108. For this reason, the cleaning unit 200 of the blade can obtain sufficient cleaning ability with a biasing force that causes it to come into slight contact with the dustproof plates 108. Further, by inclining the cleaning unit 202 by an installation angle (angle β) with respect to the traveling direction, the scraping effect of the powder 120 in a direction perpendicular to the traveling direction can be obtained. This eliminates the need to provide a biasing member for strongly biasing the cleaning unit 202 against the dustproof plates 108, and makes it possible to realize a cleaning mechanism with an inexpensive configuration.

According to the present configuration, it is possible to reduce adhesion of dust and toner to the optical scanning device or to make cleaning after adhesion easier, thereby making it possible to provide an image forming apparatus that suppresses deterioration of image quality due to adhesion of foreign matter such as dust and toner.

As described above, according to the second embodiment, foreign matter such as dust and toner adhering to the dustproof members of the optical scanning device can be easily removed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-009999 filed on Jan. 26, 2024, which is hereby incorporated by reference herein in its entirety.

What is claimed is:

1. An optical scanning device comprising:
a light source configured to emit a laser light;
a deflecting unit configured to deflect the laser light;
an optical member group configured to image the laser light, deflected and scanned by the deflecting unit, to a scanned member;
a casing in which the deflecting unit and the optical member group are accommodated, the casing including an opening through which the laser light passes; and
a light transmissive member configured to cover the opening,
wherein the light transmissive member includes a base surface and a plurality of projected portions provided on the base surface, and
wherein when a distance between a center portion of one of the projected portions and a center portion of the projected portion adjacent to the one of the projected portions with respect to a longitudinal direction of the light transmissive member is defined as an interval between the projected portions,
a height of the projected portions from the base surface is larger than the interval.

2. The optical scanning device according to claim 1, each of the projected portions has a width of ½ or less of the interval with respect to the longitudinal direction.

3. The optical scanning device according to claim 1, wherein the interval is 1 μm or less.

4. The optical scanning device according to claim 1, wherein the interval is 0.1 μm or more and 1 μm or less.

5. The optical scanning device according to claim 1, wherein the plurality of the projected portions are disposed two-dimensionally.

6. The optical scanning device according to claim 1, wherein each of the projected portions has a rib shape extending in a direction perpendicular to the longitudinal direction, and
wherein the plurality of projected portions of the light transmissive member have a stripe shape in which the projected portion is repeatedly disposed in the longitudinal direction.

7. The optical scanning device according to claim 1, wherein a material of the light transmissive member is a resin.

8. An image forming apparats for forming a toner image on a recording material, comprising:
a photosensitive member as the scanned member;

an optical scanning device according to claim 1, the optical scanning device scanning the laser light to the photosensitive member in response to image information and forming an electrostatic latent image on the photosensitive member;
a developing device configured to develop the electrostatic latent image formed on the photosensitive member with toner and form a developer image; and
a transfer unit configured to transfer the developer image onto the recording material.

9. The image forming apparatus according to claim 8, the light transmissive member is disposed to be inclined in a short side direction to a horizontal direction as seen in the longitudinal direction.

10. The image forming apparatus according to claim 9, further comprising a groove portion along the longitudinal direction on either one side of two end portions of the light transmissive member in the short side direction.

11. The image forming apparatus according to claim 10, wherein the groove portion is disposed on a side of an end portion lower in a height from the base surface of two end portions.

12. The image forming apparatus according to claim 10, further comprising a cleaning member configured to clean the light transmissive member in contact with the light transmissive member; and
a driving unit configured to drive the cleaning member so as to move in the longitudinal direction,
wherein while the cleaning member moves in the longitudinal direction, the cleaning member includes a preceding side and a succeeding side with respect to the longitudinal direction, and
wherein the groove portion is disposed on the succeeding side.

13. The image forming apparatus according to claim 9, further comprising a cleaning member configured to clean the light transmissive member in contact with the light transmissive member; and
a driving unit configured to drive the cleaning member so as to move in the longitudinal direction,
wherein while the cleaning member moves in the longitudinal direction, a leading end of the cleaning member is not perpendicular to the longitudinal direction in a plane in parallel with the light transmissible member.

14. The image forming apparatus according to claim 13, wherein the leading end is disposed with inclination by 10° or more to the longitudinal direction in the plane.

15. The image forming apparatus according to claim 8, further comprising a blowing unit; and
a guiding unit configured to guide an air generated by the blowing unit to the light transmissive member.

* * * * *